United States Patent
Beck et al.

(10) Patent No.: US 7,057,132 B2
(45) Date of Patent: Jun. 6, 2006

(54) METHOD FOR LASER WELDING A WORKPIECE

(75) Inventors: Thomas Beck, Zepernick (DE); Nigel-Philip Cox, Berlin (DE); Silke Settegast, Berlin (DE); Rolf Wilkenhoener, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 52 days.

(21) Appl. No.: 10/451,908

(22) PCT Filed: Dec. 20, 2001

(86) PCT No.: PCT/EP01/15121

§ 371 (c)(1), (2), (4) Date: Nov. 5, 2003

(87) PCT Pub. No.: WO02/051578

PCT Pub. Date: Jul. 4, 2002

(65) Prior Publication Data

US 2004/0094523 A1 May 20, 2004

(30) Foreign Application Priority Data

Dec. 27, 2000 (EP) ................... 00128575

(51) Int. Cl.
B23K 26/24 (2006.01)
B23K 26/06 (2006.01)
(52) U.S. Cl. ................................. 219/121.64
(58) Field of Classification Search .......... 219/121.63, 219/121.64
See application file for complete search history.

(56) References Cited

U.S. PATENT DOCUMENTS

| 3,761,201 | A | | 9/1973 | Silverstein et al. | |
|---|---|---|---|---|---|
| 4,314,007 | A | | 2/1982 | Gessinger | |
| 4,367,017 | A | | 1/1983 | Jimbou et al. | |
| 4,461,947 | A | | 7/1984 | Ward | |
| 4,572,941 | A | * | 2/1986 | Sciaky et al. | 219/121.64 |
| 4,626,653 | A | | 12/1986 | Sciaky et al. | |
| 4,670,638 | A | | 6/1987 | Pavlin | |
| 4,691,093 | A | * | 9/1987 | Banas et al. | 219/121.63 |
| 4,761,116 | A | | 8/1988 | Braddy et al. | |
| 4,896,944 | A | | 1/1990 | Irwin et al. | |
| 5,407,326 | A | | 4/1995 | Lardellier | |
| 5,841,097 | A | * | 11/1998 | Esaka et al. | 219/121.63 |
| 6,087,619 | A | * | 7/2000 | Berkmanns et al. | 219/121.63 |
| 6,380,509 | B1 | * | 4/2002 | Arlt | 219/121.63 |

FOREIGN PATENT DOCUMENTS

| DE | 198 17 851 | 10/1999 |
|---|---|---|
| EP | 0 340 149 | 11/1989 |

(Continued)

OTHER PUBLICATIONS

W. Brunner et al., "Wissensspeicher Lasertechnik", *Autorenkollektiv*, pp. 287-305, Mit 342 Bildern, 130 Tabellen, 2 Tafeln, Leipzig 1989.

*Primary Examiner*—Geoffrey S. Evans
(74) *Attorney, Agent, or Firm*—Harness, Dickey & Pierce, P.L.C.

(57) ABSTRACT

A method is used for laser welding a workpiece along a welding line. At least two laser beams, which are offset in relation to one another, are guided along the welding line by moving an optical deflector unit. The method may be used for welding closure pins and casting induced openings of gas turbine blades.

20 Claims, 2 Drawing Sheets

FOREIGN PATENT DOCUMENTS

| | | |
|---|---|---|
| EP | 0 876 870 | 11/1998 |
| EP | 1 027 943 | 8/2000 |
| JP | 54-116356 A * | 9/1979 |
| JP | 61-202788 A * | 9/1986 ............ 219/121.64 |
| JP | 3-285785 A * | 12/1991 |
| JP | 7-214361 A * | 8/1995 |
| JP | 9-174266 A * | 7/1997 |
| JP | 10-111471 A * | 4/1998 |
| JP | 10-272586 A * | 10/1998 |
| JP | 2000-317667 A * | 11/2000 |
| WO | 99/20430 | 4/1999 |
| WO | 00/19065 | 4/2000 |

* cited by examiner

METHOD FOR LASER WELDING A WORKPIECE

This application is the national phase under 35 U.S.C. § 371 of PCT International Application No. PCT/EP01/15121 which has an International filing date of Dec. 20, 2001, which designated the United States of America and which claims priority on European Patent Application number EP 00128575.8 filed Dec. 27, 2000, the entire contents of which are hereby incorporated herein by reference.

FIELD OF THE INVENTION

The present invention generally relates to a method for laser welding a workpiece, in particular welding a closure pin into the casting-induced opening of a cast gas turbine blade.

BACKGROUND OF THE INVENTION

In WO 00/19065 there is a description of a gas turbine blade and a method for producing a gas turbine blade. In order to form such a cast gas turbine blade through which coolant flows and which has passage openings, at least one of which is induced by casting production, in such a way that they can be produced with little scrap and largely avoiding casting defects, it is proposed that one or more of the passage openings induced by the casting process is or are passed through by a rivet-like closure pin, the foot of which is secured on the opposite side of an end wall.

To accomplish a high efficiency of the gas turbine, a working gas temperature that is as high as possible is required. The blades of the gas turbine, which are subjected to considerable loading as a result of high or changing temperatures, pressures and centrifugal forces, are metallic hollow bodies, the hollow spaces of which are flowed through by coolant. The coolant flow proceeds from the root of the gas turbine blade, by which the latter is fastened to a rotor, through an inner hollow space with meandering air ducting chambers to outlet openings in the airfoil region or in the pointed region of the gas turbine blade and forms a cooling film on the outer wall of the gas turbine blade.

To minimize the proportion of unused working gas flowing past the edge region of the gas turbine blades, the rotor with the inserted gas turbine blades is arranged inside the gas turbine in such a way that the envelope of the tips of the gas turbine blades extends at the smallest possible distance from the inner circumference of a peripheral, static guide ring. In this respect it is necessary to ensure not only a close fit but also that the gas turbine blade is not damaged and the radially outer tip region is adequately cooled. In this tip region, the outer wall of the gas turbine blade on the tip side is therefore surrounded by projecting edge pieces, the tip squealers. Cooling of this tip squealer region takes place by means of a coolant flow which flows from the inner hollow spaces through passage openings in the end wall on the tip squealer side into the tip squealer region and is led out again there through openings in the tip squealers, as disclosed in U.S. Pat. No. 4,761,116.

A gas turbine blade with internal cooling and passage openings for cooling the tip squealer region constructed on a single level is known from EP 0 340 149 B1. The production of such a gas turbine blade imposes increased requirements on the construction of the casting molds and in particular the core of the casting molds. To ensure consistent cooling of the tip squealer region, the thickness of the end wall on the tip squealer side between the hollow space and the tip squealer region must be produced with close tolerances. The core part of the system of hollow spaces is rigidly connected to the core part of the tip squealer region and in this way the two are kept at a fixed, constant distance from each other during the casting process. This connection is established by securing pins, which are anchored in both core parts. The securing pins are subjected to great loading during the casting process, as a result of which they easily break. As a result, the securing pins are to be formed with a relatively great diameter.

However, this great diameter has the effect of producing large passage openings in the end wall on the tip squealer side of the cast gas turbine blade between the hollow space and the tip squealer region. Consequently, the leakage of the coolant flowing through the passage openings is very great. One possible way of reducing the leakage of the coolant is to weld the large passage openings produced by the securing pins closed or to weld a cover plate onto them. This has the disadvantage that it may have the effect of inducing cracks, which increase during the operation of the gas turbine blade. The high temperatures during the welding may also cause recrystallization processes, which weaken the material at the locations concerned, in particular in the case of monocrystalline and directionally solidified gas turbine blades. The great loading caused by the centrifugal force when the gas turbine blades are rotating leads more frequently to the partial or complete detachment of the cover plate.

U.S. Pat. No. 3,761,201 describes a method for closing the casting-induced openings in a gas turbine blade. A closure pin which has a higher coefficient of thermal expansion than the surrounding material is inserted into the casting-induced openings in an exactly fitting manner. Diffusion welding is achieved by subsequent heating.

In the book "Wissensspeicher Lasertechnik" [compendium of laser technology] by Witlof Brunner and Klaus Junge, VEB Fachbuchverlag Leipzig 1989, laser machining and welding is described on pages 291 to 305. The construction of a laser material-machining installation is shown for example by FIG. 4.4 on page 291. A laser beam is directed in a rigidly arranged laser beam guide onto a workpiece, which is arranged on a displaceable working bench. The guidance of the working being carried out on the workpiece takes place by the displacement of the workpiece by means of the second working bench. The laser welding installations described on the subsequent pages also provide guidance for the working by means of the movement of the workpiece. Welding with lasers is discussed on page 297.

SUMMARY OF THE INVENTION

An object of the present invention is to provide a method for laser welding a workpiece which makes it possible for the regions of material lying around the weld to be impaired particularly little.

An object of the present invention is achieved according by providing a method for laser welding a workpiece along a welding line in which a laser beam is guided along the welding line by movement of an optical deflecting unit.

It is consequently proposed for the first time to guide the laser beam during the laser beam welding by way of the movement of an optical deflecting unit. While the workpiece has otherwise been moved under the working laser beam, now the laser beam itself is moved. Keeping this movement under control by an optical deflecting unit makes it possible to accomplish this with comparatively little expenditure on apparatus. In particular, however, a high machining speed is achieved by the movement of such an optical deflecting unit.

This has the consequence that the heat input of the laser into the workpiece is locally greatly delimited. As a result, the material adjacent to the weld is scarcely affected by the welding process. This counteracts in particular the formation of cracks caused by the welding process.

In one embodiment of the present invention, the welding line has a rotational symmetry. It is further preferred for the welding line to be circular-symmetrical. In such an arrangement, it is particularly favorable to guide the laser beam in a rotational movement quickly along the welding line by means of the movement of the optical deflecting unit. It is further preferred for the welding line to have a maximum diameter of 20 mm. Specifically in the case of such a comparatively small welding region, the movement of the laser beam requires a high angular speed, which can be accomplished by the movement of the optical deflecting unit. The fact that only the optical deflecting unit has to be moved means that no further heavy parts, which can be moved only by complex structural design measures, of the associated laser installation need to be moved.

In another embodiment of the present invention, the deflecting unit may be rotated. It is further preferred in this case for the deflecting unit to have an optical axis, and also an axis of rotation oriented parallel to the optical axis, the axis of rotation being spaced apart from the optical axis at an eccentric distance and the laser beam entering the deflecting unit in parallel with and at a distance from the optical axis. A rotation of the deflecting unit can be accomplished comparatively easily in terms of apparatus. In particular, the deflecting unit is a lens which is mounted eccentrically in a ball bearing and through which the laser beam passes eccentrically. This eccentric incidence on the one hand and the rotation of the lens on the other hand have the effect that the laser beam is deflected in a circular manner along the welding line. Correspondingly, it is also possible for example for a mirror to be used instead of the lens. Instead of a lens or a mirror, a prism or a wedge plate may of course also come into consideration for the deflecting unit. It is further preferred for the eccentric distance to be variable during the welding process. This also allows a welding line which is, for example, elliptical or spiral to be welded.

Furthermore, at the same time as the laser beam and offset in relation to it, a second laser beam is guided along the welding line by the movement of the optical deflecting unit. In particular, in the case of a rotationally symmetrical welding line, the two laser beams may be arranged opposite each other, so that the movement of the optical deflecting unit respectively causes a half-arc of the welding line to be welded by one of the laser beams. This has the consequence on the one hand of shortening the working time and on the other hand of making the heat distribution more uniform, which in turn favorably influences the impairment of the material.

In a further embodiment of the present invention, the deflecting unit to be a mirror which is tilted. This may be, for example, a planar mirror, which is arranged on a tripod arrangement of movable elements, which are adjusted in such a way that the mirror is tilted in a way corresponding to the desired direction of emergence for the working. In particular, piezoelectric adjusting elements are suitable.

In one embodiment of the present invention, the workpiece is a cast gas turbine blade, into which a closure pin is welded into a casting-induced opening. It is further preferred for the gas turbine blade to the made of a nickel or cobalt base superalloy. It is further preferred for it to be directionally solidified or monocrystalline. As stated at the beginning, in the case of a cast gas turbine blade, it is necessary for the casting-induced openings to be closed to save cooling air. As likewise mentioned, in this case a conventional welding process leads to an impairment of the material, which applies in particular to directionally solidified and monocrystalline gas turbine blades made of a superalloy. The laser welding process described allows this impairment of the material to be greatly reduced. However, for this it is necessary to guide the laser beam comparatively quickly along the welding line. With the comparatively small dimensions of the openings to be closed, this leads to a high angular speed of the laser beam. This cannot be accomplished by the movement of the workpiece or else of the laser installation, or only by very complex measures. This problem is solved by movement just of the optical deflecting unit.

Further scope of applicability of the present invention will become apparent from the detailed description given hereinafter. However, it should be understood that the detailed description and specific examples, while indicating exemplary embodiments of the present invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF EXEMPLARY EMBODIMENTS

The same designations have the same meaning in the various figures.

Figure 1:
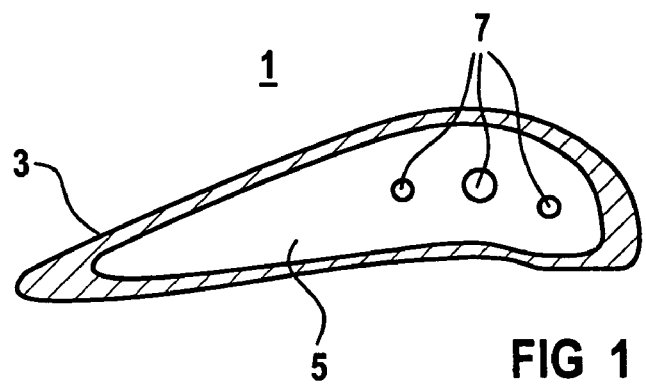
FIG. 1 shows a plan view of a gas turbine blade.

FIG. 1 schematically shows the plan view of a gas turbine blade 1. A blade airfoil 3 terminates with a blade tip 5. In this blade tip 5 there are casting-induced openings 7. These have been produced by the securement of casting cores by means of securing pins, after removal of the securing pins following the casting. The gas turbine blade 1 is formed in a hollow manner in order to make it possible for cooling air to be introduced during operation for cooling the gas turbine blade 1. A considerable part of this cooling air leaves through the casting-induced openings 7. To avoid this loss of cooling air, it is necessary to close the casting-induced openings 7. A welding method which has particularly little effect on the material is laser welding, since the energy is introduced in a targeted and directed manner (deep welding effect). This permits comparatively high working speeds with a moderate supply of energy.

Figure 2:
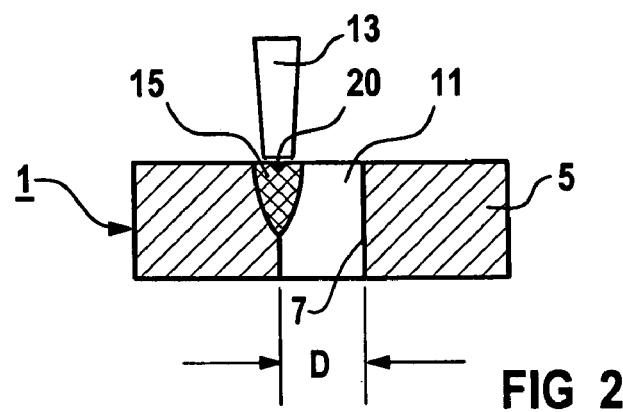
FIG. 2 shows a detail of a gas turbine blade with a casting-induced opening to be welded.

FIG. 2 is a detail of a gas turbine blade 1 with a casting-induced opening 7. A closure pin 11 has been inserted into the casting-induced opening 7. This closure pin 11 is welded by means of a laser beam 13 along a welding line 20 by producing a weld 15. So as not to affect the material surrounding the weld 15, it is necessary to guide the laser beam 13 comparatively quickly along the welding line 20. The comparatively small dimensions of the casting-induced openings 7, with a diameter D of <30 mm, in particular <20 mm and preferably <10 mm, result in a relatively high angular speed with which the laser beam 13 must be moved.

Figure 3:
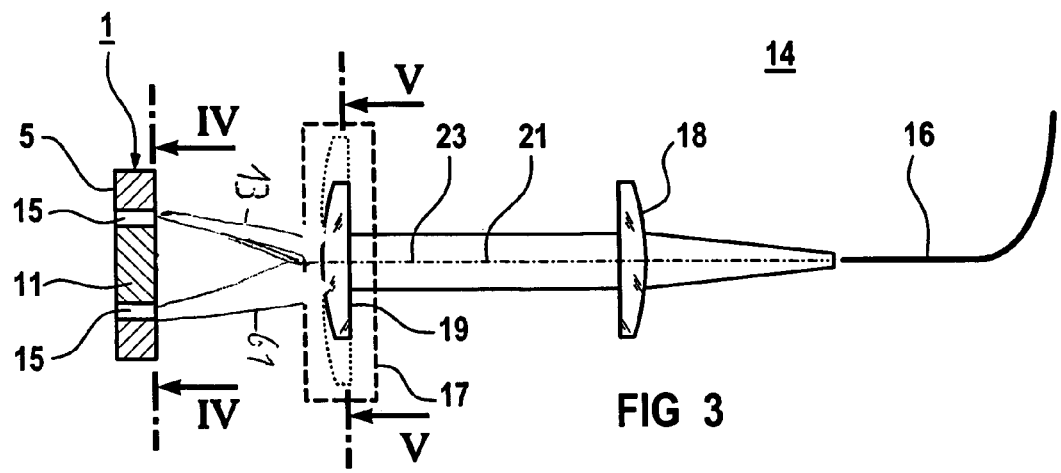
FIG. 3 shows a laser welding installation.

FIG. 3 schematically shows a laser beam installation 14. An optical-fiber cable 16 serves the purpose of guiding the laser beam 13. By means of an optical system 18, the laser beam 13 is made to expand and run parallel. The laser beam 13 then enters an optical deflecting unit 17. This optical deflecting unit 17 has a lens 19, which is arranged rotatably about an axis of rotation 23. The optical axis 21 of the lens 19 is in this case oriented parallel to but offset from the axis of rotation 23. The laser beam 13 enters the lens 19 along the axis of rotation 23. The rotation of the lens 19 has the effect that the laser beam 13 is deflected in a circular manner. As a result, the laser beam 13 is guided along the welding line 20 of the workpiece 1 to be welded.

Figure 4:
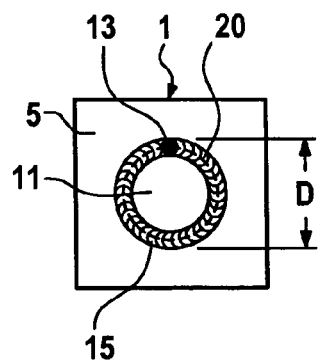
FIG. 4 shows a plan view of a welded workpiece.

FIG. 4 shows a plan view of the workpiece of FIG. 3.

Figure 5:
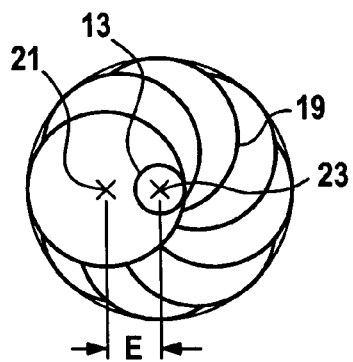
FIG. 5 shows a plan view of a rotating deflecting unit.

FIG. 5 shows a plan view of the optical deflecting unit 17. The optical axis 21 is arranged at an eccentric distance E from the axis of rotation 23. By variation of the eccentric distance E during the welding process, welding lines 20 that are other than circular can also be welded. In particular, elliptical welding lines 20 or spiral welding lines 20 can be achieved.

Figure 6:
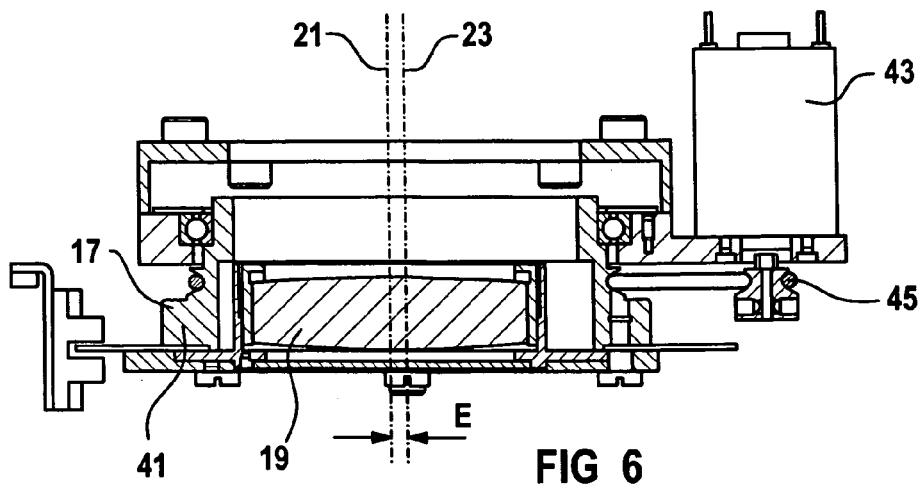
FIG. 6 shows a longitudinal section through an optical deflecting unit with a rotary drive.

FIG. 6 shows in a longitudinal section the optical deflecting unit 17 and its mounting and its drive. The lens 19 is secured in a ball bearing 41. Arranged eccentrically in the ball bearing 41 is the lens 19, the eccentric distance E between the axis of rotation 23 of the ball bearing 41 and the optical axis 21 of the lens 19 being adjustable. An electric motor 43 and a V-belt 45 can be used to rotate the ball bearing 41, and consequently the lens 19. Of course, it is also conceivable to use a mirror or a prism instead of the lens 19.

Figure 7:
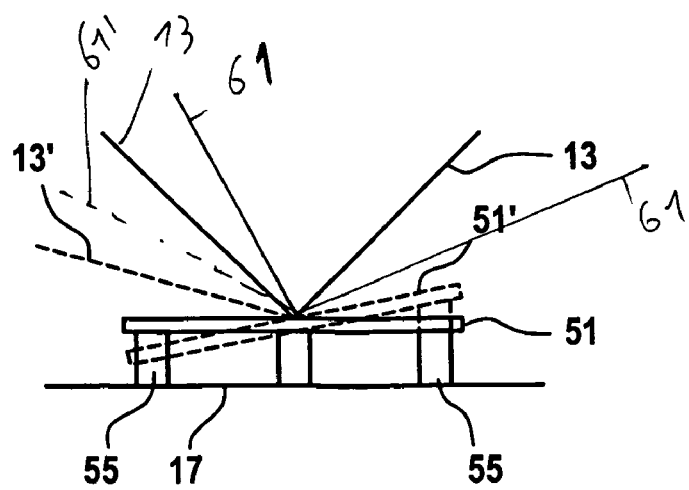
FIG. 7 shows an optical deflecting unit formed with a tiltable mirror.

FIG. 7 shows an optical deflecting unit 17, in which a mirror 51 is tilted. For this purpose, the mirror 51 is arranged on adjusting elements 55 in the form of a tripod. These adjusting elements 55 may, for example, be piezoelectrically formed. Depending on the activation of the adjusting elements 55, the mirror 51 is tilted, in particular also in a rotationally symmetrical guide. The position of the mirror 51' that is represented by dashed lines produces the direction of emergence of the laser beam 13', 61' that is represented by a dashed line.

Figure 8:
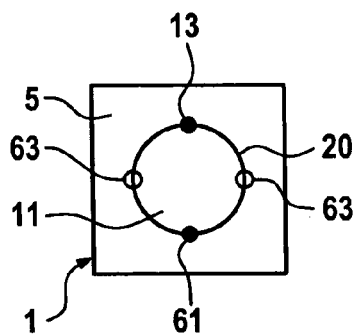
FIG. 8 shows a plan view of a workpiece with welding by way of two laser beams.

It is also possible for a number of laser beams to be guided by the optical deflecting element 17. FIG. 8 shows this by the example of two laser beams 13, 61. The two laser beams 13, 61 are arranged opposite each other in front of a circular welding line 20. Movement of the optical deflecting unit 17 causes each of the laser beams 13, 61 to describe a semi-circle. This achieves the effect of shortening the welding process on the one hand and a more uniform distribution of heat along the welding line 20 on the other hand. To make the heat distribution even more uniform and keep the cooling behavior under control, two further laser beams 63 are also arranged opposite each other and between the laser beams 13, 61. These further laser beams 63 have a lower power and are preferably formed as diode lasers. They serve for keeping the cooling behavior along the welding line 20 under control and influencing it. As a result, a further reduction in the impairment of the material and crack formation can be achieved.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for laser welding a workpiece along a circular symmetrical welding line, comprising:
    guiding a laser beam along the circular symmetrical welding line by movement of an optical deflecting unit; and
    guiding concurrently a second laser beam along the circular symmetrical welding line by the movement of the optical deflecting unit,
    wherein the laser beam is offset in relation the second laser beam.

2. The method as claimed in claim 1, wherein the deflecting unit is a mirror which is tilted.

3. The method as claimed in claim 1, wherein the circular symmetrical welding line has a rotational symmetry.

4. The method as claimed in claim 3, wherein the circular symmetrical welding line has a maximum diameter D of 20 mm.

5. The method as claimed in claim 1, further comprising rotating the deflecting unit.

6. The method as claimed in claim 5, further comprising:
    rotating the deflecting unit having an optical axis about an axis of rotation oriented parallel to the optical axis, the axis of rotation being spaced apart from the optical axis at an eccentric distance E; and
    allowing the laser beam to the deflecting unit in parallel with and at a distance from the optical axis.

7. The method as claimed in claim 6, wherein the eccentric distance E is variable during the welding process.

8. A method for laser welding a workpiece along a welding line, comprising:
    guiding laser beam along the welding line by movement of an optical deflecting unit; and
    rotating the deflecting unit having an optical axis about an axis of rotation oriented parallel to the optical axis, the axis of rotation being spaced apart from the optical axis at an eccentric distance E; and
    allowing the laser beam to enter the deflecting unit in parallel with and at a distance from the optical axis,
    wherein the eccentric distance E is variable during the welding process.

9. The method as claimed in claim 8, further comprising guiding a second laser beam along the welding line by the movement of the optical deflecting unit, wherein concurrently the laser beam is offset from the second laser beam.

10. The method as claimed in claim 8, wherein the welding line has a rotational symmetry.

11. The method as claimed in claim 8, wherein the workpiece is a cast gas turbine blade, into which a closure pin is welded into a casting-induced opening.

12. A method for laser welding a workpiece along a circular symmetrical welding line, comprising:
    guiding a laser beam along the circular symmetrical welding line by movement of an optical deflecting unit; and guiding concurrently a second laser beam along the circular symmetrical welding line by the movement of the optical deflecting unit, wherein the laser beam is offset in relation the second laser beam, and wherein the workpiece is a cast gas turbine blade, into which a closure pin is welded into a casting-induced opening.

13. The method as claimed in claim 12, wherein the gas turbine blade includes a nickel or cobalt base superalloy.

14. The method as claimed in claim 13, wherein gas turbine blade is directionally solidified or monocrystalline.

15. A method for laser welding a workpiece along a welding line, comprising:

guiding a laser beam along the welding line by movement of an optical deflecting unit; and guiding concurrently a second laser beam along the welding line by the movement of the optical deflecting unit, wherein the laser beam is offset in relation the second laser beam, and wherein the workpiece is a cast gas turbine blade, into which a closure pin is welded into a casting-induced opening.

16. A method for laser welding a workpiece along a circular symmetrical welding line, comprising:

guiding a laser beam along the circular symmetrical welding line by movement of an optical deflecting unit; and guiding concurrently a second laser beam along the circular symmetrical welding line by the movement of the optical deflecting unit, wherein the laser beam is offset in relation the second laser beam, and wherein the laser beam and the second laser beam are concurrently guided along opposite sides of the circular symmetrical welding line.

17. A method for laser welding a workpiece along a circular symmetrical welding line, comprising:

guiding a laser beam along the circular symmetrical welding line by movement of an optical deflecting unit; and guiding concurrently a second laser beam along the circular symmetrical welding line by the movement of the optical deflecting unit, wherein the laser beam is offset in relation the second laser beam, and wherein each of the laser beam and the second laser beam weld a semi-circular portion of the circular symmetrical welding line, the semi-circular portions forming a circular portion of the circular symmetrical welding line.

18. A method for laser welding a workpiece along a circular symmetrical welding line, comprising:

guiding a laser beam along the circular symmetrical welding line by movement of an optical deflecting unit;

guiding concurrently a second laser beam along the circular symmetrical welding line by the movement of the optical deflecting unit; and guiding, concurrently, a third laser beam and a fourth laser beam along the circular symmetrical welding line by movement of the optical deflecting unit; wherein the laser beam, the second laser beam, the third laser beam, and the fourth laser beam are offset in relation to one another.

19. The method of claim 18, wherein the laser beam and the second laser beam are guided along opposite sides of the circular symmetrical welding line, and the third laser beam and the fourth laser beam are guided along opposite sides of the circular symmetrical welding line.

20. A method for laser welding a workpiece along a circular symmetrical welding line, comprising:

guiding a laser beam along the circular symmetrical welding line by movement of an optical deflecting unit; and guiding concurrently a second laser beam along the circular symmetrical welding line by the movement of the optical deflecting unit, wherein the laser beam is offset in relation the second laser beam, wherein the laser beam and the second laser beam are concurrently guided along opposite sides of the circular symmetrical welding line, and wherein each of the laser beam and the second laser beam weld a semi-circular portion of the circular symmetrical welding line.

* * * * *